US011092995B2

(12) United States Patent
Guan et al.

(10) Patent No.: US 11,092,995 B2
(45) Date of Patent: Aug. 17, 2021

(54) ELECTRONIC DEVICE, CONTROL METHOD THEREOF, AND SYSTEM INCLUDING THE ELECTRONIC DEVICE

(71) Applicant: BOE TECHNOLOGY GROUP CO., LTD., Beijing (CN)

(72) Inventors: Enhui Guan, Beijing (CN); Shuo Chen, Beijing (CN); Kai Zhao, Beijing (CN); Lu Tong, Beijing (CN); Xinxin Mu, Beijing (CN); Hong Wang, Beijing (CN); Qi Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 254 days.

(21) Appl. No.: 16/330,126

(22) PCT Filed: May 22, 2018

(86) PCT No.: PCT/CN2018/087804
§ 371 (c)(1),
(2) Date: Mar. 4, 2019

(87) PCT Pub. No.: WO2018/233434
PCT Pub. Date: Dec. 27, 2018

(65) Prior Publication Data
US 2020/0209915 A1 Jul. 2, 2020

(30) Foreign Application Priority Data
Jun. 23, 2017 (CN) .......................... 201710491075.8

(51) Int. Cl.
G06F 1/16 (2006.01)
G06F 1/18 (2006.01)
G06F 1/26 (2006.01)

(52) U.S. Cl.
CPC ............ *G06F 1/1607* (2013.01); *G06F 1/189* (2013.01); *G06F 1/26* (2013.01)

(58) Field of Classification Search
CPC .... G06F 1/1607; G06F 1/1615; G06F 1/1622; G09F 11/00; G09F 11/02; G09F 11/10; Y10S 439/954
See application file for complete search history.

(56) References Cited

U.S. PATENT DOCUMENTS 4,583,798 A * 4/1986 Blazowich ............. H01R 39/64
439/24
5,923,528 A * 7/1999 Lee ....................... F16M 11/105
248/291.1

(Continued)

FOREIGN PATENT DOCUMENTS

CN 101471521 A 7/2009
CN 201265777 Y 7/2009

(Continued)

OTHER PUBLICATIONS

First Office Action for Chinese Patent Application No. 201710491075.8 dated Mar. 14, 2019.

(Continued)

*Primary Examiner* — Anthony Q Edwards
(74) *Attorney, Agent, or Firm* — Calfee, Halter & Griswold LLP

(57) ABSTRACT

An electronic device includes a body and a plug arranged at a back of the body. The body includes a display screen and a power converter for converting parameters of a power supply from a power socket. A first end of the plug is connected with the power converter, a second end of the plug can be inserted into the power socket, and the insertion direction is substantially perpendicular to a display surface of a display screen.

14 Claims, 3 Drawing Sheets

(56) References Cited

U.S. PATENT DOCUMENTS

| | | | | |
|---|---|---|---|---|
| 6,190,180 | B1* | 2/2001 | Purington | H01R 13/6276 439/17 |
| 7,740,484 | B1* | 6/2010 | Chiang | H01R 24/76 439/13 |
| 7,819,665 | B1* | 10/2010 | Nishizawa | H01R 31/06 439/13 |
| 9,660,378 | B2* | 5/2017 | Silvers | H01R 31/06 |
| 9,797,542 | B2* | 10/2017 | Grziwok | F16M 11/04 |
| 10,418,768 | B1* | 9/2019 | Xiao | H01R 13/14 |
| 2006/0141842 | A1* | 6/2006 | Sauer | H01R 13/642 439/344 |
| 2006/0185876 | A1 | 8/2006 | Aviv | |
| 2007/0047943 | A1* | 3/2007 | Seo | H04N 1/32128 396/141 |
| 2008/0211321 | A1* | 9/2008 | Liao | H01R 31/06 307/151 |
| 2013/0183854 | A1* | 7/2013 | Huang | H01R 31/06 439/534 |
| 2015/0068799 | A1* | 3/2015 | Lien | F16M 11/105 174/503 |
| 2015/0070594 | A1* | 3/2015 | Trachtenberg | H04N 5/64 348/841 |
| 2016/0166061 | A1* | 6/2016 | Trachtenberg | H01R 35/04 361/809 |
| 2017/0069297 | A1 | 3/2017 | Lu et al. | |
| 2019/0011952 | A1* | 1/2019 | Galipeau | F16M 11/041 |
| 2019/0208651 | A1* | 7/2019 | Wang | F16M 11/105 |
| 2019/0291657 | A1* | 9/2019 | Zhang | B60R 11/0235 |

FOREIGN PATENT DOCUMENTS

| | | |
|---|---|---|
| CN | 101578746 A | 11/2009 |
| CN | 202091896 U | 12/2011 |
| CN | 102622179 A | 8/2012 |
| CN | 202930002 U | 5/2013 |
| CN | 203338678 U | 12/2013 |
| CN | 103823620 A | 5/2014 |
| CN | 105488156 A | 4/2016 |
| CN | 205406855 U | 7/2016 |
| CN | 205541673 U | 8/2016 |
| CN | 205722619 U | 11/2016 |
| CN | 206246946 U | 6/2017 |
| CN | 107300928 A | 10/2017 |
| GB | 2518157 A | 3/2015 |

OTHER PUBLICATIONS

Search Report and Written Opinion for International Application No. PCT/CN2018/087804 dated Aug. 29, 2018.

* cited by examiner

ELECTRONIC DEVICE, CONTROL METHOD THEREOF, AND SYSTEM INCLUDING THE ELECTRONIC DEVICE

CROSS REFERENCE TO RELATED APPLICATIONS

The present application is a 35 U.S.C. 371 national stage application of PCT International Application No. PCT/CN2018/087804, filed on May 22, 2018, which claims the benefit of a Chinese patent application No. 201710491075.8, filed on Jun. 23, 2017, the contents of which are incorporated herein by reference in their entireties.

TECHNICAL FIELD

The present disclosure relates to the technical field of display devices, in particular to an electronic device and a control method thereof.

BACKGROUND

Compared with traditional picture frames, the electronic picture frame can display pictures more effectively and conveniently. However, in the prior art, the electronic picture frame needs to be connected with an external power supply through a power line when being powered on, so that the structure of the electronic picture frame is complicated, and the exposed power line will affect the aesthetics of the electronic picture frame.

SUMMARY

In view of this, some embodiments of the present disclosure provide an electronic device, a control method thereof, and a system including the electronic device.

An electronic device according to an exemplary embodiment of the present disclosure includes a body including a display screen and a power converter for converting parameters of a power supply from a power socket; a plug arranged at the back of the body, wherein the first end of the plug is electrically connected with the power converter, the second end of the plug can be inserted into the power socket, and the insertion direction is substantially perpendicular to the display surface of the display screen.

In certain exemplary embodiments, the electronic device further comprises a rotating member connecting the body and the plug, which can drive the body to rotate around the central axis of the plug in a plane parallel to the display surface of the display screen.

In certain exemplary embodiments, the rotating member comprises a bearing, and the inner ring of the bearing is fixedly connected with the plug; the outer ring of the bearing is fixedly connected with the body.

In certain exemplary embodiments, the inner ring of the bearing is sleeved over the plug. The electronic device further comprises a stopper fixed on the plug, and the stopper is used for restricting the movement of the inner ring of the bearing relative to the plug.

In certain exemplary embodiments, the electronic device further comprises a locking structure for locking and unlocking the body relative to the power socket.

In certain exemplary embodiments, the locking structure is linear motor(s), and the shaft of the linear motor can be extended and retracted in a direction perpendicular to the display surface of the display screen.

In certain exemplary embodiments, the electronic device further comprises a driving member connected with the rotating member and used for driving the rotating member to rotate so as to drive the body to rotate; a processor which is connected with the driving member and configured for sending a control command to the driving member so as to control the driving member to work.

In certain exemplary embodiments, the processor is further configured to confirm the current state of the body and the format of the picture displayed on the display screen; when the picture is a horizontal picture and the body is in a vertical state, the processor controls the driving member to work so that the driving member drives the body to rotate to a horizontal state; when the picture is a vertical picture and the body is in a horizontal state, the processor controls the driving member to work so that the driving member drives the body to rotate to a vertical state.

In certain exemplary embodiments, the body has a first axis of symmetry and a second axis of symmetry perpendicular to each other; the length of the first axis of symmetry is greater than the length of the second axis of symmetry. The electronic device further comprises a first height sensor and a second height sensor arranged on the body, wherein the line connecting the first height sensor and the second height sensor is parallel to the first axis of symmetry or the second axis of symmetry.

When the line connecting the first height sensor and the second height sensor is parallel to the first axis of symmetry, the processor is configured to confirm that the body is in a vertical state when the absolute value of the height difference between the first height sensor and the second height sensor is greater than half of the distance between the first height sensor and the second height sensor; confirm that the body is in a horizontal state when the absolute value of the height difference between the first height sensor and the second height sensor is less than or equal to half of the distance between the first height sensor and the second height sensor.

When the line connecting the first height sensor and the second height sensor is parallel to the second axis of symmetry, the processor is configured to confirm that the body is in a horizontal state when the absolute value of the height difference between the first height sensor and the second height sensor is greater than half of the distance between the first height sensor and the second height sensor; confirm the body is in a vertical state when the absolute value of the height difference between the first height sensor and the second height sensor is less than or equal to half of the distance between the first height sensor and the second height sensor.

In certain exemplary embodiments, the processor is configured to confirm that the picture is a horizontal picture when the width value of the picture is greater than the height value; confirm that the picture is a vertical picture when the width value of the picture is less than or equal to the height value.

In other embodiments of the present disclosure, a control method for the electronic device described above is provided, the control method comprising: confirming the current state of the body of the electronic device and the format of the picture displayed on the display screen; when the picture is a horizontal picture and the body is in a vertical state, driving the body to rotate to a horizontal state; when the picture is a vertical picture and the body is in a horizontal state, driving the body to rotate to a vertical state.

In certain exemplary embodiments, the body comprises a first axis of symmetry and a second axis of symmetry; the electronic device includes a first height sensor and a second height sensor.

The step of confirming the current state of the body comprises:

when the line connecting the first height sensor and the second height sensor is parallel to the first axis of symmetry, if the absolute value of the height difference between the first height sensor and the second height sensor is greater than half of the distance between the first height sensor and the second height sensor, confirming that the body is in a vertical state; if the absolute value of the height difference between the first height sensor and the second height sensor is less than or equal to half of the distance between the first height sensor and the second height sensor, confirming that the body is in a horizontal state;

when the line connecting the first height sensor and the second height sensor is parallel to the second axis of symmetry, if the absolute value of the height difference between the first height sensor and the second height sensor is greater than half of the distance between the first height sensor and the second height sensor, confirming that the body is in a horizontal state; if the absolute value of the height difference between the first height sensor and the second height sensor is less than or equal to half of the distance between the first height sensor and the second height sensor, confirming that the body is in a vertical state.

In certain exemplary embodiments, confirming the format of the picture displayed on the display screen comprises: if the width value of the picture is larger than the height value, confirming that the picture is a horizontal picture; if the width value of the picture is less than or equal to the height value, confirming that the picture is a vertical picture.

In other embodiments of the present disclosure, a system comprising the electronic device described above is provided, wherein the electronic device comprises a body and a plug arranged on the back of the body, the body comprises a display screen and a power converter for converting parameters of a power supply from a power socket, a first end of the plug is electrically connected with the power converter, a second end of the plug can be inserted into the power socket, and the insertion direction is substantially perpendicular to the display surface of the display screen. The system further comprises a power socket for inserting the plug. The power socket comprises a recess. The bottom surface of the recess is provided with a jack. The plug comprises a main body. One end of the main body facing the power socket is provided with a blade. At least a part of the main body is engaged in the recess, and the blade is inserted into the jack.

In certain exemplary embodiments, the electronic device further comprises linear motor(s), and the power socket is further provided with fixing hole(s) for inserting the shaft(s) of the linear motor(s).

BRIEF DESCRIPTION OF THE DRAWINGS

In order to explain the technical solution in the embodiments of the present disclosure more clearly, the drawings that need to be used in the description of the embodiments will be briefly introduced below. Obviously, the drawings in the following description are only some embodiments of the present disclosure. For those of ordinary skill in the art, other drawings can be obtained without creative effort.

DETAILED DESCRIPTION

The technical solution in the embodiments of the present disclosure will be described clearly and completely below with reference to the drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts are within the scope of protection of the present disclosure.

Figure 1:
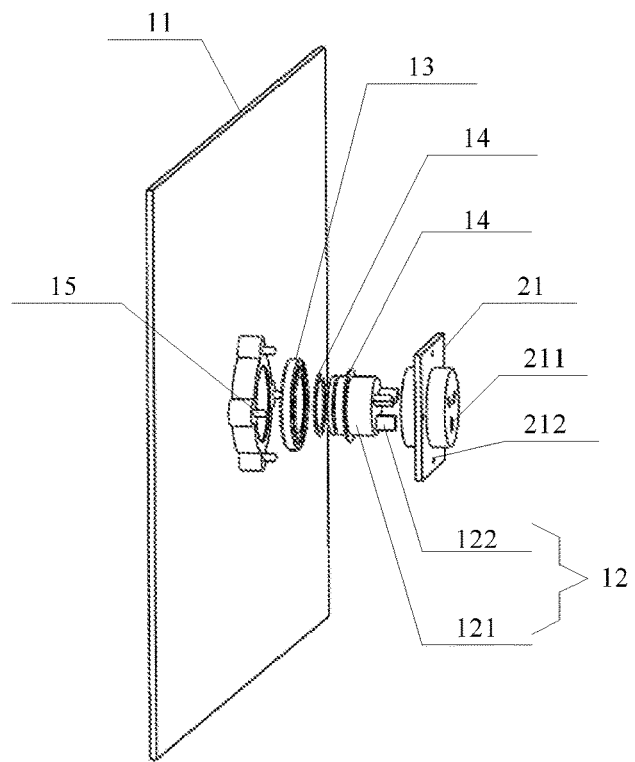
FIG. 1 is an exploded view of a system comprising an electronic device provided by some embodiments of the disclosure.
Figure 2:
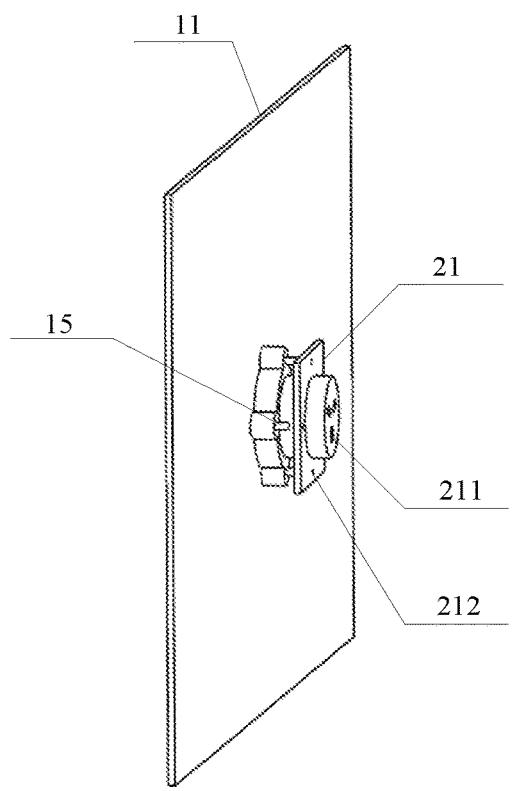
FIG. 2 is a schematic view of a locking structure for a power socket and a body of an electronic device according to some embodiments of the present disclosure, wherein the locking structure is in an unlocked state.
Figure 3:
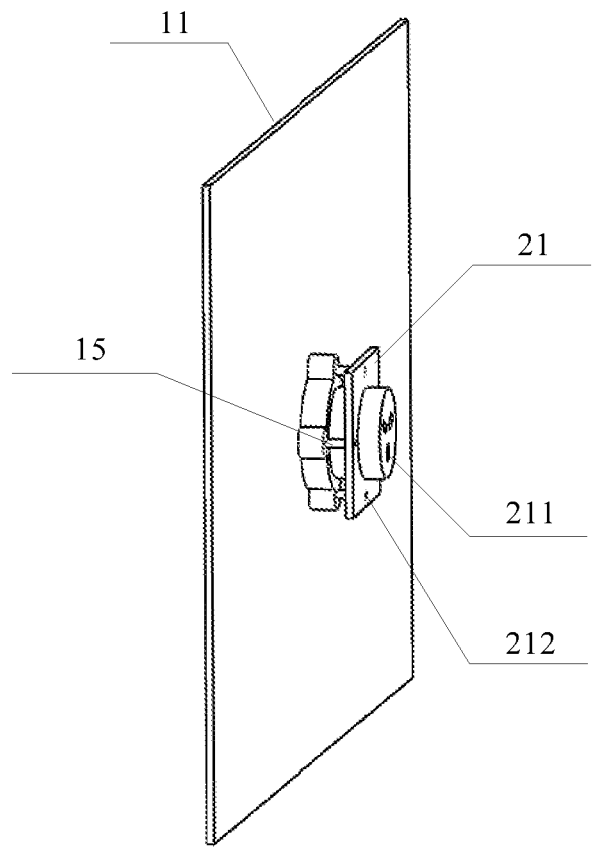
FIG. 3 is a schematic view of a locking structure for a power socket and a body of an electronic device according to some embodiments of the present disclosure, wherein the locking structure is in a locked state.

Some embodiments of the present disclosure provide an electronic device, as shown in FIGS. 1 to 3, which comprises a body 11 which includes a display screen and a power converter for converting parameters of a power supply from a power socket, thereby providing an appropriate power supply for the display screen. The power converter is, for example, a power adapter, which may include at least one of the following: a transformer and a rectifier. The electronic device also includes a plug 12 disposed at the back of the body 11, wherein a first end of the plug 12 is electrically connected with a power converter in the body 11, and a second end of the plug 12 can be plugged into a power socket 21 so as to be connected with a mains network. The insertion direction of the plug 12 is substantially perpendicular to the display surface of the display screen.

The electronic device is a device that can display an electronic picture. For example, it can be an electronic picture frame, a display or the like. The embodiments of the present disclosure will not make any limitations on it.

The plug 12 is electrically connected with the power converter which typically includes a power transformer and a rectifying circuit.

In this way, compared with the prior art, the electronic device provided by the embodiment of the present disclosure can be directly plugged into the power socket by fixedly arranging the plug connected with the external power supply (i.e., the power socket) at the back of the body, thus saving the power line in the prior art, simplifying the structure of the electronic device and improving the aesthetics of the electronic device.

In practical application, when the body 11 of an electronic device has, for example, a shape with a long axis of symmetry and a short axis of symmetry perpendicular to each other, i.e., the body 11 has a rectangular or elliptical shape, the body 11 has two states, i.e., a horizontal state and a vertical state, while the picture displayed on the display screen of the electronic device generally includes two formats, i.e., a horizontal picture and a vertical picture. When the state of the body 11 is not consistent with the format of the picture displayed on the display screen, the display effect of the picture may be poor, so the body 11 needs to be rotated at this time so that the state of the body 11 is consistent with the format of the picture displayed on the display screen.

Therefore, the electronic device further comprises a rotating member which connects the body 11 and the plug 12 and can drive the body 11 to rotate around the central axis of the plug 12 in a plane parallel to the display surface of the display screen. By arranging the rotating member, the body 11 can rotate relative to the plug 12, so that the state of the body 11 is consistent with the format of the picture displayed by the body 11, and the observability of the picture displayed by the electronic device is improved.

Referring to FIG. 1, the rotating member includes a bearing 13. The inner ring of the bearing 13 is fixedly connected with the plug 12 and the outer ring of the bearing 13 is fixedly connected with the body 11. Since the bearing 13 can keep its inner ring stationary while its outer ring rotates, the rotation of the body 11 relative to the plug 12 can be easily and conveniently realized.

The inner ring of the bearing 13 can be interference fit on the plug 12 to restrict the movement of the inner ring of the bearing 13 relative to the plug 12. The inner ring of the bearing 13 may be sleeved over the plug 12 first, and then the movement of the inner ring of the bearing 13 relative to the plug 12 may be restricted by a stopper 14 fixed on the plug 12. The embodiment of the present disclosure does not limit the fixed connection between the inner ring of the bearing 13 and the plug 12. In addition, the number of stoppers 14 may be one or more, for example, two in FIG. 1.

Furthermore, the electronic device also includes a locking structure for locking and unlocking the body 11 and the power socket 21. By providing the locking structure, when the body 11 does not need to rotate, the body 11 is locked with the power socket 21, so that the body 11 can be stably in the current state to display pictures.

In practical application, the specific structure of the locking structure can be varied, and the embodiments of the present disclosure will not make any limitations on it. For example, referring to FIGS. 1 to 3, the locking structure is linear motor(s), and the shaft 15 of the linear motor can be extended and retracted in a direction perpendicular to the display surface of the display screen. The power socket 21 is provided with fixing hole(s) 212 for inserting the shaft(s) 15 of the linear motor(s). When it is necessary to lock the body 11 and the power socket 21, the shaft 15 of the linear motor is controlled to extend to be inserted into the fixing hole 212 of the power socket 21; when it is necessary to unlock the body 11 and the power socket 21, the shaft 15 of the linear motor is controlled to retract from the fixing hole 212 of the power socket 21.

The embodiments of the present disclosure do not limit the number of the linear motors, and those of ordinary skill in the art can set them according to the actual situation. A plurality of the linear motors can be provided, so that the locking effect of the body 11 and the power socket 21 can be better. For example, as shown in FIG. 1, four tubular linear motors are used in four corners for locking operation.

Further, the electronic device further comprises a driving member connected with the rotating member for driving the rotating member to rotate so as to drive the body 11 to rotate; wherein the driving member is generally a rotary driving motor. The electronic device also includes a processor connected with the driving member for sending a control command to the driving member to control the operation of the driving member.

Specifically, the processor is also used to confirm the current state of the body 11 and the format of the picture displayed on the display screen. When the picture is a horizontal picture and the body 11 is in a vertical state, the processor controls the driving member to work so that the driving member drives the body 11 to rotate to a horizontal state; when the picture is a vertical picture and the body 11 is in a horizontal state, the driving member is controlled to work so that the driving member drives the body 11 to rotate to a vertical state. The current state of the body 11 includes a horizontal state and a vertical state. The horizontal state is a state wherein the length of the body 11 in the horizontal direction is greater than its length in the vertical direction. The vertical state is a state wherein the length of the body 11 in the horizontal direction is smaller than its length in the vertical direction. The format of the picture refers to whether the picture is horizontal or vertical. When the picture is a horizontal picture and the body 11 is in a vertical state, the driving member drives the body 11 to rotate 90 degrees so that the body 11 is in a horizontal state to better display the horizontal picture. When the picture is a vertical picture and the body 11 is in a horizontal state, the driving member drives the body 11 to rotate 90 degrees so that the body 11 is in a vertical state so as to better display the vertical picture. By arranging the driving member and the processor, the electronic device can automatically rotate, thus improving the intelligence of the electronic device.

Figure 4:
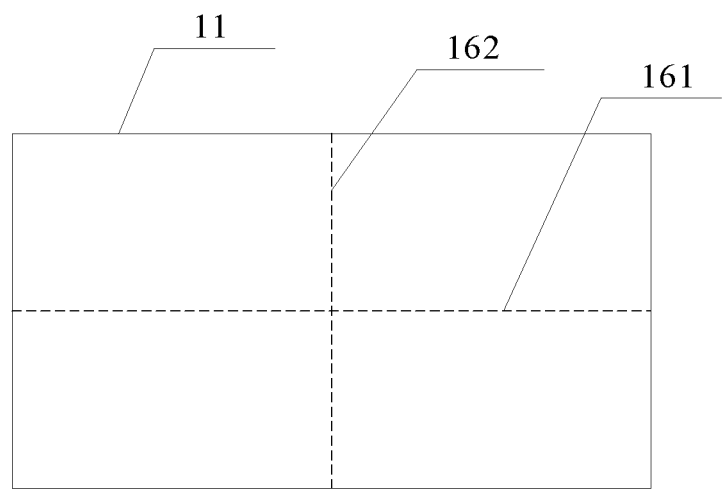
FIG. 4 is a schematic structural view of a body of an electronic device provided by some embodiments of the disclosure.
Figure 5:
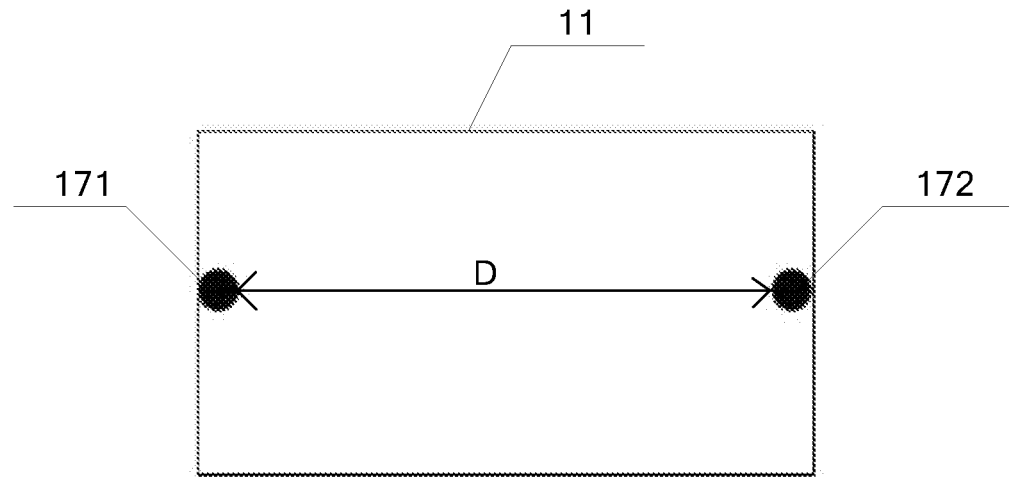
FIG. 5 is a schematic structural view of a body of an electronic device provided with a first height sensor and a second height sensor according to some embodiments of the present disclosure.

Further, referring to FIGS. 4 and 5, the body 11 has a first axis of symmetry 161 and a second axis of symmetry 162 perpendicular to each other. The length of the first axis of symmetry 161 is greater than the length of the second axis of symmetry 162. The electronic device also includes a first height sensor 171 and a second height sensor 172 arranged on the body 11, and the line connecting the first height sensor 171 and the second height sensor 172 is parallel to the first axis of symmetry 161 or the second axis of symmetry 162.

When the line connecting the first height sensor 171 and the second height sensor 172 is parallel to the first axis of symmetry 161, the processor is specifically used to confirm that the body 11 is in a vertical state when the absolute value of the height difference between the first height sensor 171 and the second height sensor 172 is greater than half of the distance D between the first height sensor 171 and the second height sensor 172; confirm that the body 11 is in the horizontal state when the absolute value of the height difference between the first height sensor 171 and the second height sensor 172 is less than or equal to half of the distance D between the first height sensor 171 and the second height sensor 172.

When the line connecting the first height sensor 171 and the second height sensor 172 is parallel to the second axis of symmetry 162, the processor is specifically used to confirm that the body 11 is in a horizontal state when the absolute value of the height difference between the first height sensor 171 and the second height sensor 172 is greater than half of the distance D between the first height sensor 171 and the second height sensor 172; confirm that the body 11 is in a vertical state when the absolute value of the height difference between the first height sensor 171 and the second height sensor 172 is less than or equal to half of the distance D between the first height sensor 171 and the second height sensor 172.

For example, referring to FIGS. 4 and 5, the line connecting the first height sensor 171 and the second height sensor 172 is parallel to the first axis of symmetry 161. Assuming the height detected by the first height sensor 171 is H1 and the height detected by the second height sensor 172 is H2, the absolute value of the difference between the height detected by the first height sensor 171 and the height detected by the second height sensor 172 is. Taking half D/2 of the distance D between the first height sensor 171 and the second height sensor 172 as the judgment threshold, when H>D/2, it is considered that the first height sensor 171 and the second height sensor 172 are not at the same horizontal height, and at this time, it is confirmed that the body 11 is in a vertical state. When H<D/2, it is considered that the first height sensor 171 and the second height sensor 172 are at the same horizontal height, and at this time, it is confirmed that the body 11 is in the horizontal state.

Further, the processor is specifically configured to confirm that the picture is a horizontal picture when the width value of the picture is larger than the height value; confirm that the picture is a vertical picture when the width value of the picture is less than or equal to the height value. In practical application, the processor can first obtain the width value and height value of the picture, and then confirm the format of the picture by comparing the width value and height value.

Figure 6:
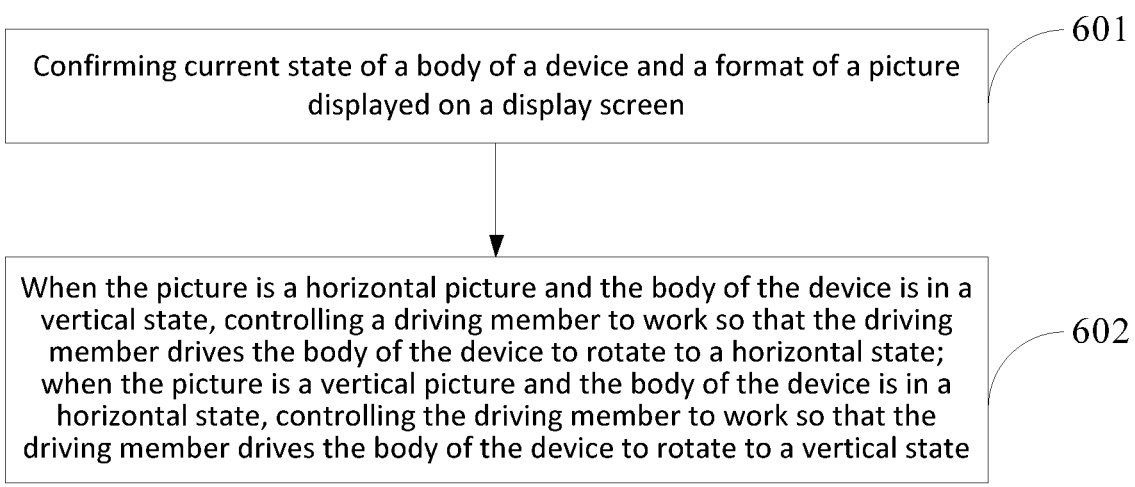
FIG. 6 is a flowchart of a control method for an electronic device according to some embodiments of the present disclosure.

Other embodiments of the present disclosure provide a control method for the electronic device described above, as shown in FIG. 6, the control method comprises:

Step 601: confirming the current state of the body 11 of the electronic device and the format of the picture displayed on the display screen;

Wherein the current state of the body 11 includes a horizontal state and a vertical state; the format of the picture refers to whether the picture is horizontal or vertical.

Step 602: when the picture is a horizontal picture and the body 11 is in a vertical state, controlling the driving member to work so that the driving member drives the body 11 to rotate to a horizontal state; when the picture is a vertical picture and the body 11 is in a horizontal state, controlling the driving member to work so that the driving member drives the body 11 to rotate to a vertical state.

When the picture is a horizontal picture and the body 11 is in a vertical state, the driving member drives the body 11 to rotate 90 degrees so that the body 11 is in a horizontal state to better display the horizontal picture. When the picture is a vertical picture and the body 11 is in a horizontal state, the driving member drives the body 11 to rotate 90 degrees so that the body 11 is in a vertical state so as to better display the vertical picture.

Furthermore, the body 11 includes a first symmetry axis 161 and a second symmetry axis 162. The electronic device includes a first height sensor 171 and a second height sensor 172;

The step of confirming the current state of the body 11 specifically includes:

when the line connecting the first height sensor 171 and the second height sensor 172 is parallel to the first axis of symmetry 161, if the absolute value of the height difference between the first height sensor 171 and the second height sensor 172 is greater than half of the distance D between the first height sensor 171 and the second height sensor 172, confirming that the body 11 is in a vertical state; if the absolute value of the height difference between the first height sensor 171 and the second height sensor 172 is less than or equal to half of the distance D between the first height sensor 171 and the second height sensor 172, confirming that the body 11 is in a horizontal state;

when the line connecting the first height sensor 171 and the second height sensor 172 is parallel to the second axis of symmetry 162, if the absolute value of the height difference between the first height sensor 171 and the second height sensor 172 is greater than half of the distance D between the first height sensor 171 and the second height sensor 172, confirming that the body 11 is in a horizontal state; if the absolute value of the height difference between the first height sensor 171 and the second height sensor 172 is less than or equal to half of the distance D between the first height sensor 171 and the second height sensor 172, confirming that the body 11 is in a vertical state.

Further, the step of confirming the format of the picture displayed on the display screen specifically includes:

if the width value of the picture is larger than the height value, confirming that the picture is a horizontal picture; if the width value of the picture is less than or equal to the height value, confirming that the picture is a vertical picture.

Still other embodiments of the present disclosure provide a system including the electronic device described above. Referring to FIG. 1, the electronic device includes a body 11 and a plug 12 disposed at the back of the body 11. The body 11 includes a display screen and a power converter, the plug 12 is connected with the power converter, and the insertion direction of the plug 12 is perpendicular to the display surface of the display screen. The system also includes a power socket 21 for inserting the plug 12. The power socket 21 includes a recess (a recessed structure with an open end facing the plug 12), and the bottom surface of the recess (opposite to the open end) has a jack 211. The plug 12 includes a main body 121 with a blade 122 at one end facing the power socket 21, at least a part of the main body 121 is engaged into the recess, and the blade 122 is inserted into the jack 211. By providing the recess for inserting the main body 121 in the power socket 21, the connection between the plug 12 and the power socket 21 can be made more stable. At the same time, since the body 11 of the electronic device is fixed with the plug 12, the plug 12 is engaged with the power socket 21, and the power socket 21 is generally fixed on the wall, thus the electronic device is fixed on the wall through the plug 12 and the power socket 21. Therefore, the screw structure adopted in the prior art for fixing the electronic device is omitted, and the damage to the wall caused by the screw structure is avoided.

Further, when the electronic device includes linear motor (s), the power socket 21 is also provided with fixing hole(s) 212 for inserting the shaft(s) 15 of the linear motor(s). As shown in FIG. 1, the power socket 21 is provided with four fixing holes 212 on four sides of the power socket 21 to fit the shafts 15 of the four linear motors. When it is necessary to lock the body 11 and the power socket 21, the shafts 15 of the linear motors are controlled to be inserted into the fixing holes 212 of the power socket 21. When it is necessary to unlock the body 11 and the power socket 21, the shafts 15 of the linear motors are controlled to be retracted from the fixing holes 212 of the power socket 21.

The electronic device comprises a body which including a display screen and a power converter; a plug arranged on the back of the body, wherein the plug is connected with the power converter, and the plug insertion direction is perpendicular to the display surface of the display screen. Compared with the prior art, the electronic device provided by some embodiments of the present disclosure can be directly plugged into the power socket by arranging the plug connected with the external power supply on the back of the body, thus eliminating the power line in the prior art, simplifying the structure of the electronic device and improving the aesthetics of the electronic device.

In the description of the present disclosure, it is to be understood that, the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential" indicate an orientation or positional relationship based on the orientation or positional relationship shown in the drawings. It is only for the convenience of describing the present disclosure and simplifying the description, and is not intended to indicate or imply that the device or element in question must have a particular orientation, be constructed and operated in a particular orientation, and therefore should not be construed as limiting the present disclosure.

Moreover, the terms "first" and "second" are used for descriptive purposes only and are not to be understood as indicating or implying relative importance or implicitly indicating the number of indicated technical features. Thus, features defining "first" and "second" may explicitly or implicitly include at least one such feature. In the description of this disclosure, "plurality" means at least two, e.g., two, three, etc., unless expressly and specifically defined otherwise.

In the description of this specification, the description with reference to the terms "one embodiment", "some embodiments", "examples", "specific examples", or "some examples" and the like means that a specific feature, structure, material, or characteristic described in connection with the embodiment or example is included in at least one embodiment or example of the present disclosure. In this specification, the schematic representation of the above terms does not necessarily refer to the same embodiment or example. Moreover, the specific features, structures, materials, or characteristics described may be combined in any one or more embodiments or examples in a suitable manner. In addition, without contradicting each other, those of ordinary skill in the art may combine different embodiments or examples described in this specification and features of different embodiments or examples.

The foregoing is only specific embodiments of the present disclosure, but the scope of protection of the present disclosure is not limited thereto. Any person skilled in the art can easily think of modifications or substitutions within the technical scope of the present disclosure and all those modifications or substitutions should be covered by the scope of protection of the present disclosure. Therefore, the scope of protection of the present disclosure shall be subject to the scope of protection of the claims.

The invention claimed is:

1. An electronic device comprising:
   a body comprising a display screen and a power converter which is used for converting parameters of a power supply from a power socket;
   a plug arranged at a back of the body, wherein a first end of the plug is electrically connected with the power converter, a second end of the plug can be inserted into the power socket, and an insertion direction is substantially perpendicular to a display surface of the display screen; and
   linear motor(s) with shaft(s), wherein the shaft(s) of the linear motor(s) is configured to be capable of inserting into fixing hole(s) of the power socket.

2. The electronic device according to claim 1, further comprising:
   a rotating member connecting the body and the plug, wherein the rotating member can drive the body to rotate around a central axis of the plug in a plane parallel to the display surface of the display screen.

3. The electronic device according to claim 2, wherein the rotating member comprises a bearing, and an inner ring of the bearing is fixedly connected with the plug; an outer ring of the bearing is fixedly connected with the body.

4. The electronic device according to claim 3, wherein the inner ring of the bearing is sleeved over the plug;
   the electronic device further comprises a stopper fixed on the plug, and the stopper is used for restricting a movement of the inner ring of the bearing relative to the plug.

5. The electronic device according to claim 2, further comprising:
   a locking structure for locking and unlocking the body relative to the power socket.

6. The electronic device according to claim 5, wherein the locking structure is linear motor(s), and a shaft of the linear motor can be extended and retracted in a direction perpendicular to the display surface of the display screen.

7. The electronic device according to claim 2, further comprising:
   a driving member connected with the rotating member and used for driving the rotating member to rotate so as to drive the body to rotate;
   a processor connected with the driving member and is used for sending a control command to the driving member to control the driving member to work.

8. The electronic device according to claim 6, wherein a processor is further configured to confirm a current state of the body and a format of a picture displayed on the display screen; when the picture is a horizontal picture and the body is in a vertical state, the processor is configured to control a driving member to work so that the driving member drives the body to rotate to a horizontal state; when the picture is a vertical picture and the body is in the horizontal state, the processor is configured to control the driving member to work so that the driving member drives the body to rotate to the vertical state.

9. The electronic device according to claim 8, wherein the body has a first axis of symmetry and a second axis of symmetry perpendicular to each other; a length of the first axis of symmetry is greater than a length of the second axis of symmetry;
   the electronic device further comprises a first height sensor and a second height sensor arranged on the body, wherein a line connecting the first height sensor and the second height sensor is parallel to the first axis of symmetry or the second axis of symmetry;
   when the line connecting the first height sensor and the second height sensor is parallel to the first axis of symmetry, the processor is configured to confirm that the body is in the vertical state when an absolute value of a height difference between the first height sensor and the second height sensor is greater than half of a distance between the first height sensor and the second height sensor, and confirm that the body is in the horizontal state when the absolute value of the height difference between the first height sensor and the second height sensor is less than or equal to half of the distance between the first height sensor and the second height sensor;

when the line connecting the first height sensor and the second height sensor is parallel to the second axis of symmetry, the processor is configured to confirm that the body is in the horizontal state when the absolute value of the height difference between the first height sensor and the second height sensor is greater than half of the distance between the first height sensor and the second height sensor, and confirm that the body is in the vertical state when the absolute value of the height difference between the first height sensor and the second height sensor is less than or equal to half of the distance between the first height sensor and the second height sensor.

10. The electronic device according to claim 8, wherein the processor is configured to confirm that the picture is the horizontal picture when a width value of the picture is greater than a height value of the picture, and confirm that the picture is the vertical picture when the width value of the picture is less than or equal to the height value of the picture.

11. A control method for an electronic device, wherein the electronic device comprises:
   a body comprising a display screen and a power converter which is used for converting parameters of a power supply from a power socket a plug arranged at a back of the body, wherein a first end of the plug is electrically connected with the power converter, a second end of the plug can be inserted into the power socket, and an insertion direction is substantially perpendicular to a display surface of the display screen; and
   a rotating member connecting the body and the plug, wherein the rotating member can drive the body to rotate around a central axis of the plug in a plane parallel to the display surface of the display screen,
   wherein the control method comprises following steps:
   confirming a current state of the body of the electronic device and a format of a picture displayed on the display screen;
   when the picture is a horizontal picture and the body is in a vertical state, driving the body to rotate to a horizontal state; when the picture is a vertical picture and the body is in the horizontal state, driving the body to rotate to the vertical state.

12. The control method according to claim 11, wherein the body comprises a first axis of symmetry and a second axis of symmetry; the electronic device comprises a first height sensor and a second height sensor;
   the step of confirming the current state of the body comprises:
   when a line connecting the first height sensor and the second height sensor is parallel to the first axis of symmetry, if an absolute value of a height difference between the first height sensor and the second height sensor is greater than half of a distance between the first height sensor and the second height sensor, confirming that the body is in the vertical state;
   if the absolute value of the height difference between the first height sensor and the second height sensor is less than or equal to half of the distance between the first height sensor and the second height sensor, confirming that the body is in the horizontal state;
   when the line connecting the first height sensor and the second height sensor is parallel to the second axis of symmetry, if the absolute value of the height difference between the first height sensor and the second height sensor is greater than half of the distance between the first height sensor and the second height sensor, confirming that the body is in the horizontal state; if the absolute value of the height difference between the first height sensor and the second height sensor is less than or equal to half of the distance between the first height sensor and the second height sensor, confirming that the body is in the vertical state.

13. The control method according to claim 11, wherein confirming the format of the picture displayed on the display screen comprises:
   if a width value of the picture is larger than a height value of the picture, confirming that the picture is the horizontal picture; if the width value of the picture is less than or equal to the height value of the picture, confirming that the picture is the vertical picture.

14. A system comprising an electronic device, wherein the electronic device comprises a body and a plug arranged at the back of the body, the body comprises a display screen and a power converter for converting parameters of a power supply from a power socket, a first end of the plug is electrically connected with the power converter, a second end of the plug can be inserted into the power socket, and an insertion direction is substantially perpendicular to a display surface of the display screen;
   wherein the system further comprises the power socket for inserting the plug, the power socket comprises a recess, a bottom surface of the recess is provided with a jack, the plug comprises a main body, one end of the main body facing the power socket is provided with a blade, at least a part of the main body is engaged in the recess, and the blade is inserted into the jack, and
   wherein the electronic device further comprises linear motor(s), and the power socket is further provided with fixing hole(s) for inserting shaft(s) of the linear motor(s).

\* \* \* \* \*